United States Patent
Dykeman et al.

(10) Patent No.: US 6,835,480 B2
(45) Date of Patent: Dec. 28, 2004

(54) METHOD OF USING A TEMPORARY DILUTE SURFACTANT WATER SOLUTION TO ENHANCE MASS TRANSPORT IN A FUEL CELL

(75) Inventors: Emily A. Dykeman, Cheyenne, WY (US); Patrick L. Hagans, Columbia, CT (US); Leslie L. Van Dine, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/331,570

(22) Filed: Dec. 30, 2002

(65) Prior Publication Data

US 2004/0126630 A1 Jul. 1, 2004

(51) Int. Cl.[7] .............................................. H01M 8/04
(52) U.S. Cl. ........................................... 429/13; 429/34
(58) Field of Search ...................................... 429/13, 34

(56) References Cited

U.S. PATENT DOCUMENTS

| | | | |
|---|---|---|---|
| 4,861,730 A | 8/1989 | Hsia et al. ..................... | 437/43 |
| 5,597,751 A | 1/1997 | Wang ........................... | 437/43 |
| 5,783,473 A | 7/1998 | Sung ............................ | 438/265 |
| 5,998,058 A | 12/1999 | Fredley | |
| 6,316,135 B1 | 11/2001 | Breault et al. | |
| 6,699,612 B2 * | 3/2004 | Breault et al. ................ | 429/26 |
| 2003/0064258 A1 * | 4/2003 | Pan et al. ..................... | 429/13 |

FOREIGN PATENT DOCUMENTS

JP          2001-13533 8          5/2001

* cited by examiner

*Primary Examiner*—John S. Maples
(74) *Attorney, Agent, or Firm*—Malcolm J. Chisholm, Jr.

(57) ABSTRACT

The invention is a method of using a temporary dilute surfactant water solution to enhance mass transport in a fuel cell (10) that generates electrical current from hydrogen containing reducing fluid and oxygen containing oxidant reactant streams. The method includes the steps of: a. directing the dilute surfactant water solution to flow through a cathode flow field (20) of a fuel cell (10); b. then removing the solution from the fuel cell (10); and, c. then directing flow of the reactant streams through the flow fields (12) (20). The temporary dilute surfactant water solution has a surface tension of not less than 50 dynes/cm. Flowing the temporary dilute surfactant water solution through the fuel cell (10) for a temporary, short duration improves mass transport of the cell (10) even after the solution is removed from the cell (10).

13 Claims, 5 Drawing Sheets

METHOD OF USING A TEMPORARY DILUTE SURFACTANT WATER SOLUTION TO ENHANCE MASS TRANSPORT IN A FUEL CELL

TECHNICAL FIELD

The present invention relates to fuel cells that are suited for usage in transportation vehicles, portable power plants, or as stationary power plants, and the invention especially relates to improved mass transport of water and oxidant within the fuel cell.

BACKGROUND ART

Fuel cells are well known and are commonly used to produce electrical energy from hydrogen containing reducing fluid and oxygen containing oxidant reactant streams to power electrical apparatus such as motors, and transportation vehicles, etc. In operation of a fuel cell, the electrochemical reaction of the reducing fluid and oxidant at anode and cathode catalyst surfaces of the electrolyte produces an electrical current and also produces product water at the cathode catalyst. In fuel cells of the prior art, it is well known that as a fuel cell reaches its maximum rated power output and current density increases, increased production of product water at the cathode catalyst may flood the cathode catalyst and thereby impede flow of the oxidant reactant stream by the cathode catalyst. As flow of the oxidant is impeded by flooding of the cathode catalyst, production of electrical current is also limited. Therefore, inadequate mass transport of oxidant to and product water away from the cathode catalyst severely limits fuel cell performance at high fuel cell current densities.

Known efforts to enhance mass transport of product water include utilization of hydrophilic components that define a cathode flow field adjacent the cathode catalyst or cathode electrode. For example, it is common to add hydrophilic rendering compounds to porous carbon materials making up support layers adjacent to the cathode catalyst. The pores of such carbon support materials define a cathode flow field for directing the oxidant to flow adjacent the cathode catalyst and for directing the product water to flow away from the cathode catalyst. Hydrophilic carbon support layers are shown in U.S. Pat. No. 5,998,058, which issued on Dec. 7, 1999, and that is owned by the owner of all rights in the present invention, and in a U.S. Patent Application published on Jun. 13, 2002 under Ser. No. U.S. 2002/0071978 A1, that is also owned by the owner of all rights in the present invention. It is also known to utilize a porous water transport plate in fluid communication with the cathode flow field, wherein a coolant stream passing through the plate flows at a pressure that is less than a pressure of the oxidant flowing through the cathode flow field so that product water will readily move into the porous water transport plate, such as disclosed in U.S. Pat. No. 6,316,135 that issued on Nov. 13, 2001, and is also owned by the owner of all rights in the present invention. Such efforts, however are also known to be costly, and may include additional bulky components. Frequently addition of hydrophilic rendering compounds will present other difficulties, not just in cost, but for example in limiting electrical conductivity of the components.

A further effort at enhancing mass transport within a fuel cell is disclosed in a Japanese Patent Application No. 11-313,691, published on May 18, 2001, under Publication No. 2001-135338. It discloses utilization of a supply of preferably ethanol and injectors to inject some of the ethanol into the reactant streams passing through a fuel cell so that the ethanol decreases a contact angle formed by a surface of condensed water droplets, of for example product water, and a surface for directing the reactant gases through the fuel cell, in order to improve drainage of the condensed water out of the cell. While such an approach may enhance mass transport of fuel cell water, it necessitates use of one or more injectors, storage of ethanol or similar compounds with the fuel cell, and passage of those compounds with the reactant streams out of the fuel cell to present additional problems related to environmental hazards of fuel cell exhaust gases.

It is desirable, therefore, to develop a method of operating a fuel cell that efficiently enhances mass transport of fuel cell water and oxidant at high current densities of an operating fuel cell.

DISCLOSURE OF INVENTION

The invention is a method of using a temporary dilute surfactant water solution to enhance mass transport in a fuel cell that generates electrical current from hydrogen containing reducing fluid and oxygen containing oxidant reactant streams. The fuel cell includes a cathode catalyst and an anode catalyst on opposed surfaces of an electrolyte, a cathode flow field for directing the oxidant reactant stream to pass adjacent to the cathode electrode, and an anode flow field for directing the reducing fluid reactant stream to flow adjacent to the anode electrode. The method of using the temporary dilute surfactant water solution to enhance mass transport of the cell includes the steps of: a. directing a temporary dilute surfactant water solution to flow through at least one of the flow fields, wherein the temporary dilute surfactant water solution has a surface tension of not less than 50 dynes per square centimeter (hereafter "dynes/cm"); b. then, removing the temporary dilute surfactant water solution from the fuel cell; and, c. then directing the oxygen containing oxidant reactant stream to flow through the cathode flow field and directing the hydrogen containing reducing fluid stream to flow through the anode flow field.

During experiments by the inventors of the present invention to ascertain a value of temporary antifreeze surfactant water solutions of varying concentrations within a fuel cell, it was unexpectedly determined that an application of a dilute surfactant water solution flowing through flow fields of the cell for a temporary, short duration improved mass transport of the cell even after the dilute surfactant water solution stopped flowing through the cell and was removed from the cell. It is theorized that the dilute surfactant water solution having a surface tension of not less than 50 dyne/cm partially wets a porous catalyst support layer and/or the catalyst, wherein pores of the layer define the flow field through which the dilute surfactant solution flows. The wetting of the porous support layer and/or the catalyst may establish permanent water transfer paths that facilitate mass transport of product water from the cathode catalyst, thereby resulting in improved transport of oxygen to the cathode catalyst, all of which enhances fuel cell performance.

In preferred methods of using a temporary dilute surfactant water solution to enhance mass transport, the dilute surfactant water solution may be directed to flow through a porous water transport plate within a liquid coolant stream, wherein the porous water transport plate is in fluid communication with at least one of the flow fields of the cell, and preferably, with the cathode flow field. The temporary dilute surfactant water solution may also be flowed through the fuel cell for a pre-determined time prior to a break-in period, wherein generation of electrical current by the fuel cell for the first time has achieved 100% of a rated power. By the phrase "rated power", it is meant that both current and voltage from the fuel cell meet design specifications of the fuel cell.

In further preferred methods, the dilute surfactant is selected from the group consisting of methanol, ethanol, propanol, isopropyl alcohol, acetone, acetic acid, acetaldehyde, and propylamine, or mixtures thereof. In a further preferred method, the temporary dilute surfactant water solution is about a 12.5% methanol water solution. In a further preferred method, the dilute surfactant is selected from the group consisting of surfactants having a solubility in water that is greater than 25 grams per 100 grams of water, having a surface tension not greater than 35 dynes/cm, and having a boiling point of not greater than 120° C.

Accordingly, it is a general purpose of the present invention to provide a method of using a dilute surfactant solution to enhance mass transport in a fuel cell that overcomes deficiencies of the prior art.

It is a more specific purpose to provide a method of using a dilute surfactant solution to enhance mass transport in a fuel cell by facilitating removal of product water from the fuel cell and by facilitating transfer of an oxidant to a cathode catalyst of the fuel cell.

These and other purposes and advantages of the present method of using a dilute surfactant solution to enhance mass transport in a fuel cell will become more readily apparent when the following description is read in conjunction with the accompanying drawing.

DESCRIPTION OF THE PREFERRED EMBODIMENTS

Figure 1:
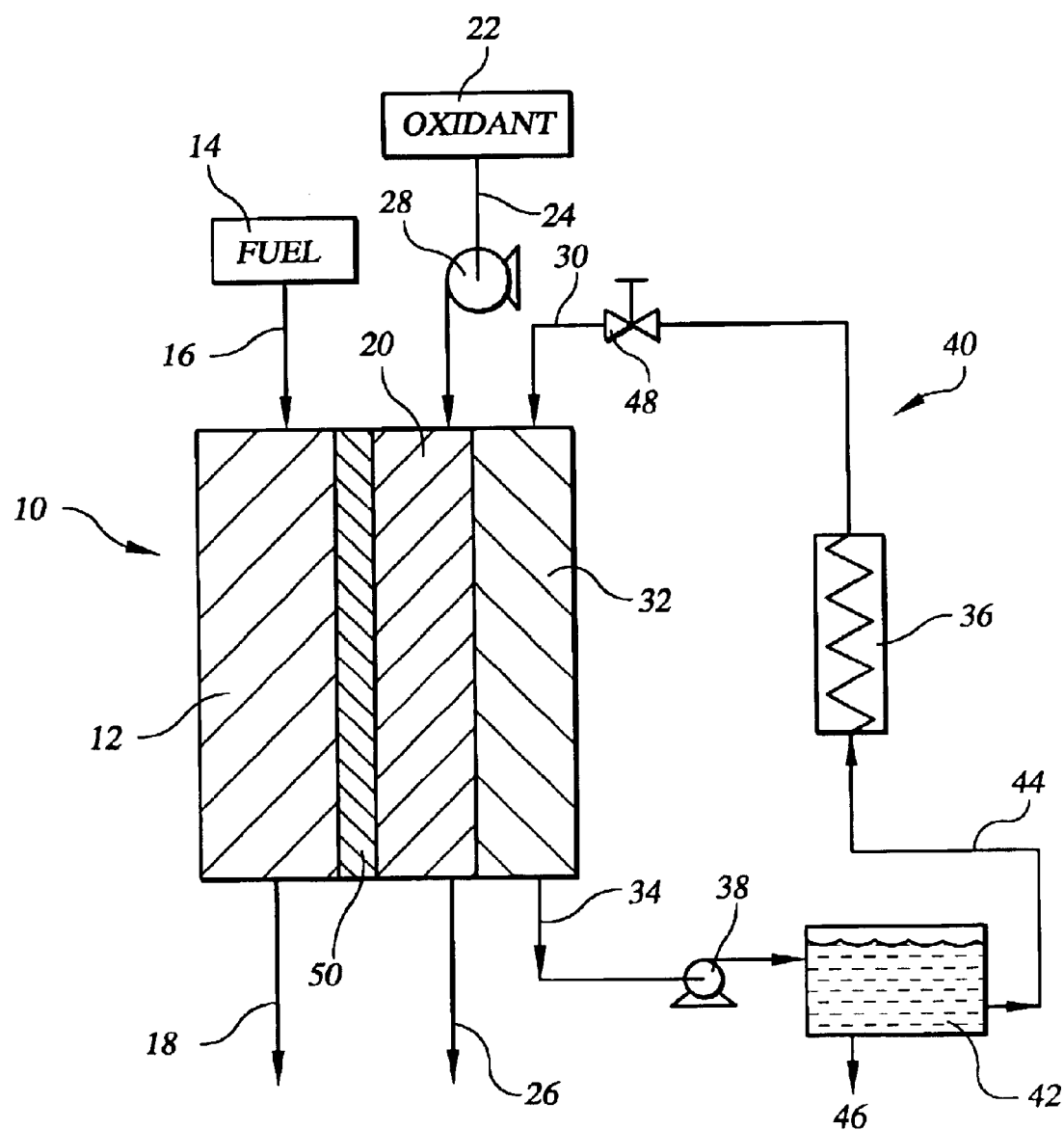
FIG. 1 is a schematic representation of an embodiment of a fuel cell appropriate for the method of using a dilute surfactant solution to enhance mass transport in the fuel.

Referring to the drawings in detail, a first embodiment of a fuel cell appropriate for the method of using a dilute surfactant solution to increase mass transport is shown in FIG. 1, and is generally designated by the reference numeral 10. The fuel cell 10 includes an anode flow field 12 that receives a hydrogen containing reducing fluid reactant stream directed from a fuel supply 14 through a fuel passage 16 to flow through the anode flow field 12 and leave the fuel cell through an anode exhaust 18. The fuel cell 10 also includes a cathode flow field 20 that receives an oxygen containing oxidant reactant stream directed from an oxidant supply 22 (which may be simply a supply of atmospheric air, as is known) through an oxidant passage 24 to flow through the cathode flow field 20 and out of the fuel cell 10 through a cathode flow field exhaust 26. The oxidant passage 24 may also include a blower 28 to increase a pressure of the oxidant reactant stream entering the cathode flow field 20.

The fuel cell 10 may also include a cooling fluid directed to pass through a coolant feed line 30 to flow through a water transport plate 32 secured adjacent to the cathode flow field 20, and out of the fuel cell 10 in a coolant discharge line 34. The water transport plate 32 may be porous so that it may receive fuel cell product water to remove the product water from the fuel cell 10, as is known in the art. The coolant feed line 30 and the coolant discharge line 34 may be in fluid communication with a coolant heat exchanger 36 to cool the cooling fluid, such as an automotive radiator heat exchanger known in the art. A coolant pump 38 may be secured to the coolant discharge line 34 to pump the cooling fluid into the coolant heat exchanger 36, coolant feed line 30, water transport plate 32, and coolant discharge line 34, to form a coolant loop 40, well known in the art. A cooling fluid accumulator means 42 for accumulating liquid cooling fluid may also receive some of the cooling fluid and any product water formed by the fuel cell 10 and flowing from the fuel cell through the water transport plate 32, and coolant discharge line 34. The coolant accumulator may direct the accumulated cooling fluid and/or fuel cell product water through an accumulator vent 46 to other systems to support the fuel cell 10, such as a humidification system, fuel processing system, (not shown), etc., as is well known in the art.

The fuel cell 10 may also include a pressure control means for maintaining a positive pressure differential between the oxidant reactant stream passing through the cathode flow field 20 and the cooling fluid passing through the water transport plate 32, such as a pressure control valve 48, as disclosed in the aforesaid U.S. Pat. No. 6,316,135. The fuel cell 12 also includes a membrane electrode assembly 50 ("M.E.A.") secured between the anode and cathode flow fields 12, 20 that facilitates an electrochemical reaction involving the reducing fluid and oxidant reactant streams to produce electrical current, as is well known.

Figure 2:
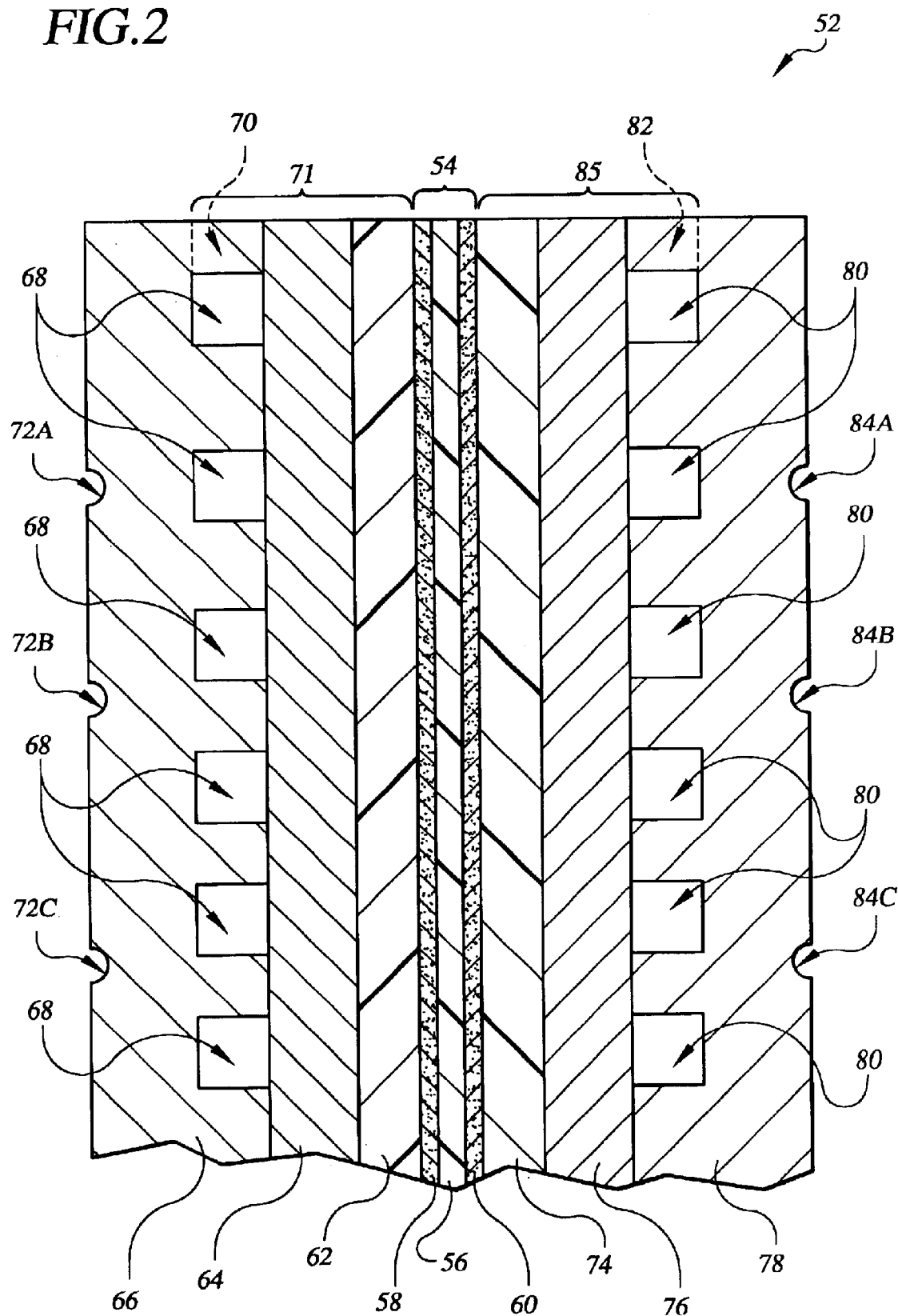
FIG. 2 is a schematic, fragmentary cross-section view of a second preferred fuel cell appropriate for the method of using a dilute surfactant solution to enhance mass transport in the fuel cell.

A second preferred fuel cell 52 appropriate for the present invention is shown in FIG. 2, wherein a second M.E.A. 54 includes an electrolyte 56, such as a proton exchange membrane ("P.E.M.") secured between an anode catalyst 58 and a cathode catalyst 60. The second fuel cell 52 also includes an anode support means consisting of one or more porous layers for supporting the anode catalyst 58 and for permitting fluid flow through the anode support means. The one or more porous layers of the anode support means may include an anode diffusion layer 62 secured adjacent to the anode catalyst 58, and an anode substrate layer 64 secured adjacent to the anode diffusion layer 62. An anode water transport plate 66 may also be secured adjacent to the anode support means, such as adjacent to the anode substrate 64. The anode water transport plate 66 may be secured in fluid communication with a thermal management system, such as with the coolant loop 40 shown in FIG. 1, for directing a coolant fluid to flow through the plate 66 to remove heat, to humidify the fuel reactant stream, and possibly to remove product water from the fuel cell 52. The anode water transport plate 66 may also define a plurality of fuel flow channels 68 for directing the hydrogen rich reducing fluid to flow from a reducing fluid inlet 70 adjacent to the anode substrate 64. It is pointed out that the plurality of fuel flow channels 68, and pore space within the anode substrate layer 64 and diffusion layer 62 cooperate to define a second anode flow field 71 such as shown schematically in FIG. 1 at reference numeral 12. The first and second fuel cells 10, 52 may include flow fields that consist of cavities, differing channels or grooves, etc., as is known in the art. The anode water transport plate 66 may also define a plurality of anode coolant feed channels 72A, 72B, 72C that direct a cooling fluid stream to pass into the pores defined within the anode water transport plate 66.

The second preferred fuel cell 52 shown in FIG. 2 also includes a cathode support means for supporting the cathode catalyst 60, such as one or more layers, as with the anode support means; such as a cathode diffusion layer 74 secured adjacent to the cathode catalyst 60, and a cathode substrate layer 76 secured adjacent to the cathode diffusion layer 74. A cathode water transport plate 78 may be secured adjacent to the cathode support means, as shown in FIG. 2. The cathode water transport means 78 may define a plurality of oxidant flow channels 80 in fluid communication with an oxidant inlet 82 for directing the oxidant reactant stream to flow adjacent to the cathode support means, such as adjacent to the cathode substrate layer 76. The cathode water transport plate 78 may also define a plurality of cathode coolant feed channels 84A, 84B, 84C for directing a coolant stream to flow into and through the cathode water transport plate 78. As with the anode water transport plate 66, the oxidant flow channels 80 of the cathode water transport plate 78, and pores within the cathode substrate layer 76 and diffusion layer 74 may serve to define a second cathode flow field 85 represented schematically in FIG. 1 at reference numeral 32. The cathode flow field 32 may also be formed by alternate cavities, channels, grooves, etc. that are known in the art.

The described components of the first and second fuel cells 10, 52 may be constructed of materials known in the art, such as materials described in the aforesaid U.S. Pat. Nos. 6,316,135 and 5,998,058. Additionally, the anode catalyst 58, adjacent anode diffusion layer 62, anode substrate 64, cathode catalyst 60, adjacent cathode diffusion layer 74, and cathode substrate 76 may be constructed to be partially hydrophobic by procedures known in the art, such as by procedures disclosed in U.S. Pat. No. 5,998,058.

Use of the first fuel cell 10 or second fuel cell 52 to implement the present method of using a dilute surfactant solution to enhance mass transport in the fuel cells 10, 52 may involve simply directing a dilute surfactant water solution to flow directly into the cathode flow field 20, such as by mixing the dilute surfactant solution with the oxygen containing oxidant reactant stream passing through the oxidant passage 24, or by mixing the dilute surfactant water solution with the hydrogen rich reducing fluid reactant stream within the fuel passage 16, or by mixing the dilute surfactant water solution with both reactant streams prior to the streams entering the anode and cathode flow fields 12, 20.

Preferably, the dilute surfactant water solution is directed into the cathode flow field 20 by mixing the dilute surfactant solution with the cooling fluid entering the cathode water transport plate 78. As is well known in the art, the second fuel cell 52 would be structured to be placed adjacent additional fuel cells (not shown) to form a fuel cell stack assembly (not shown) with cooperating manifolds, plumbing, etc. In such an environment, the cathode water transport plate 78 would be secured adjacent an anode water transport plate of an adjacent cell, so that the cathode coolant feed channels 84A, 84B, 84C would mate with anode coolant feed channels of the adjacent fuel cell (not shown). Because the pores of the cathode water transport plate 78 and an adjacent anode water transport plate of the adjacent fuel cell (not shown) would be filled with the liquid cooling fluid, the plates 78 would cooperate to form a gaseous fluid seal to prohibit mixing of the oxidant reactant stream within the cathode oxidant channels 80 and the reducing fluid reactant stream within flow channels of the adjacent anode water transport plate. However, because the dilute surfactant solution is a liquid, directing it to flow within the cooling fluid into the cathode water transport plate 78 would permit the dilute surfactant solution to move throughout the cathode water transport plate 78, the cathode flow field 85 defined by the oxidant channels 80 and the cathode substrate 76 and cathode diffusion layers 74 to contact the cathode catalyst 60, and would permit movement of the dilute surfactant solution into any adjacent anode water transport plate, and anode flow field defined by anode substrate and diffusion layers of an adjacent fuel cell (not shown) and to thereby contact an anode catalyst of such an adjacent fuel cell (not shown).

Figure 3:
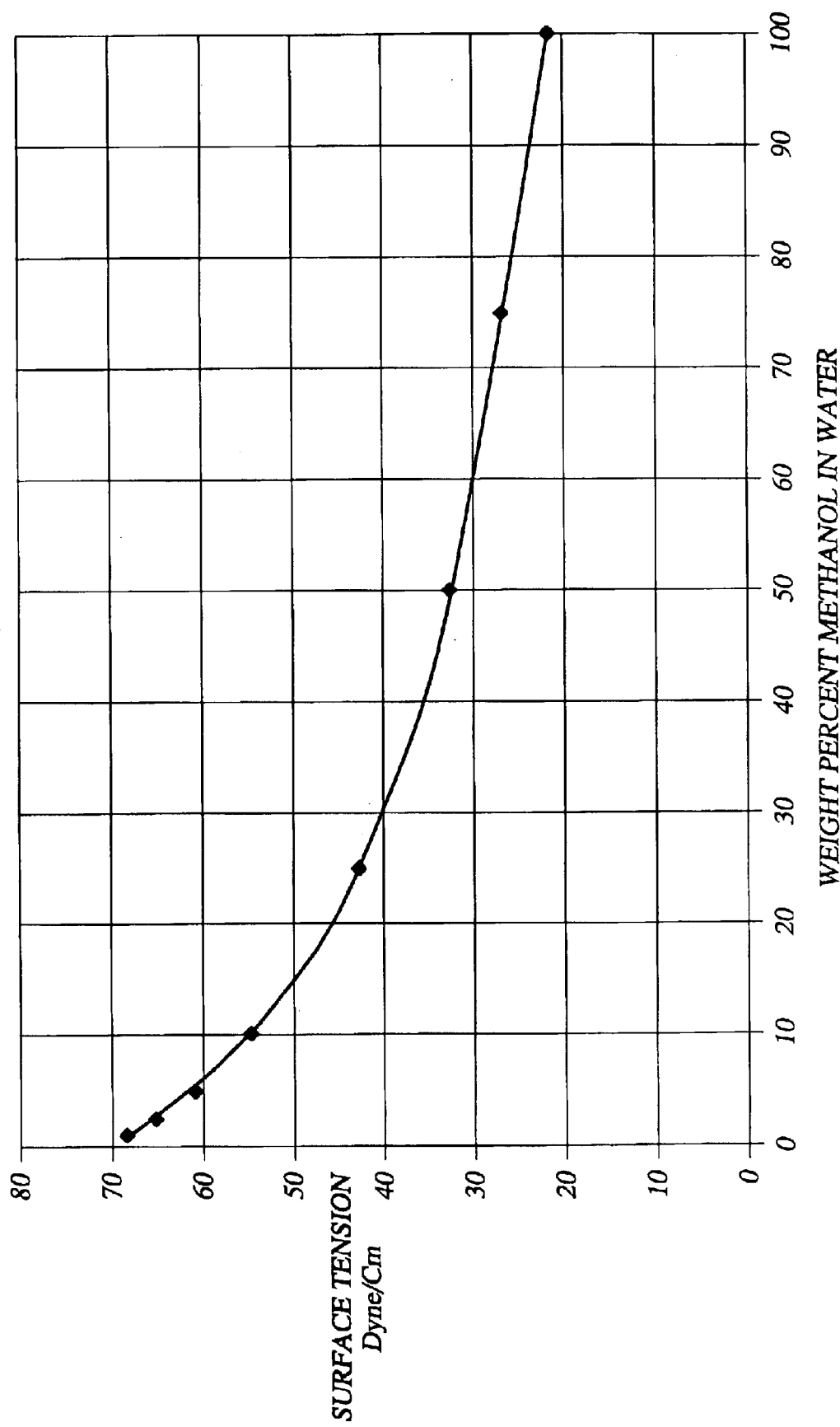
FIG. 3 is a graph showing surface tension of methanol solutions as a function of varying weight percents of methanol in water.

The present inventors were undertaking experiments to evaluate use of various antifreeze solutions passing through the water transport plates 66, 78 to prevent freezing of fuel cell components upon shut down of the fuel cell. It was found that high methanol water solutions resulted in unacceptable and permanent performance loss by the fuel cell 52. However, the inventors unexpectedly discovered that a dilute methanol water solution resulted in enhanced mass transport within the fuel cell 52 when operating at high current densities. This beneficial result was observed to the surprise of the inventors even after the dilute methanol solution had been removed from the fuel cell 52 by evaporation along with exhausted reactant streams or by oxidation at the fuel cell 52 cathode catalyst layer 60 or anode catalyst layer 58. It is theorized by the inventors that the dilute methanol water solution having a surface tension of not less than 50 dynes/cm partially wets the cathode diffusion layer 74 and/or the cathode catalyst layer 60 establishing permanent water transfer paths through these fuel cell 52 components. The permanent water transfer pathways facilitate removal of product water from the cathode catalyst 60, cathode diffusion layer 74 and any adjacent cathode substrate layer 76 so that transport of oxygen to the cathode catalyst 60 is enhanced. It is known that methanol water solutions have a lower surface tension than pure water. Therefore, methanol is an effective surfactant. For purposes herein, "surfactant" is meant to describe any substance that lowers the surface tension of water when added to water or exposed to water. FIG. 3 is a graph showing a decrease in surface tension of a methanol water solution as a function of an increasing weight percent of methanol in water. The inventors determined that an optimal weight percent of methanol in water of 12.5 percent methanol resulting in a surface tension of about 50 dynes/cm produced optimal enhancement of mass transport within a fuel cell operating at high current densities.

Further undertakings by the inventors determined that additional dilute water solutions of surfactants other than methanol that have properties similar to methanol would also serve to enhance mass transport in a fuel cell. Therefore, a preferred surfactant appropriate for forming a dilute surfactant water solution of the present invention is a surfactant selected from the group consisting of surfactants having a solubility in water that is greater than 25 grams per 100 grams of water, having a surface tension not greater than 35 dynes/cm, and having a boiling point of not greater than 120° C. Exemplary surfactants that exhibit such properties include surfactants selected from the group consisting of linear alcohols, branched alcohols, aldehydes, ketones, and organic acids, or mixtures thereof. Additional exemplary surfactants for forming acceptable dilute surfactant solutions include surfactants selected from the group consisting of methanol, ethanol, propanol, isopropyl alcohol, acetone, acetic acid, acetaldehyde, and propylamine, or mixtures thereof.

Figure 4:
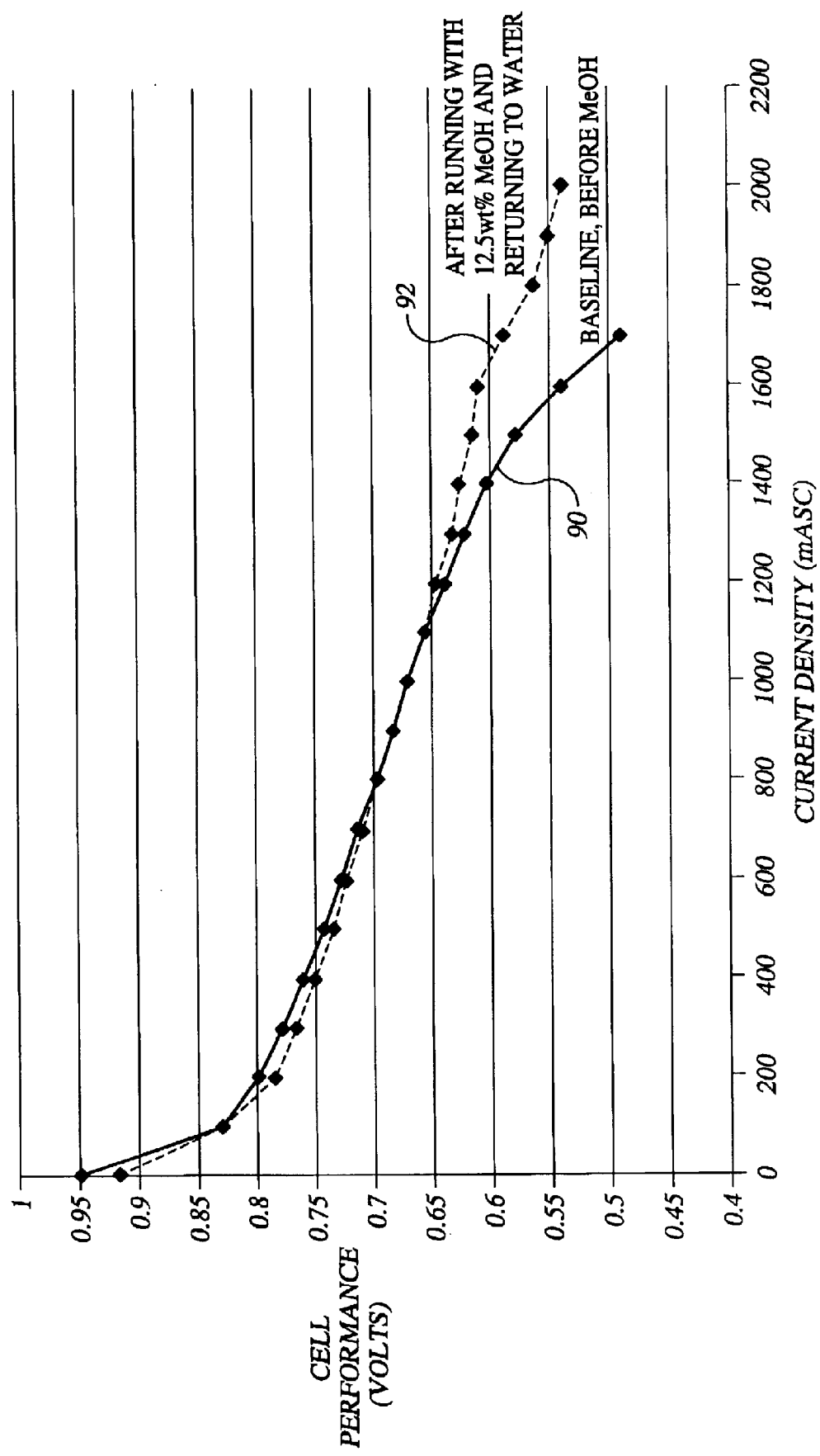
FIG. 4 is a graph showing performance of a fuel cell before and after the fuel cell is run with a dilute surfactant solution.

FIG. 4 shows a graph that demonstrates how cell performance improved after an exemplary fuel cell (not shown) was operated with a dilute surfactant water solution. The exemplary cell was a single fuel cell having no diffusion layer on the anode side, and having a hydrophobic diffusion layer on the cathode side of the cell. This cell was the same as described in the aforesaid U.S. Patent Application published on Jun. 13, 2002 under publication No. U.S. 2002/0071978 A1, wherein the fuel cell is described in FIG. 6 and at paragraph No. 0058. The exemplary fuel cell included a proton exchange membrane ("PEM") electrolyte, and was dimensioned so that the exemplary fuel cell and a coolant loop having a porous water transport plate, as shown in FIG. 1, had a coolant volume of about 1 liter. The fuel cell was first operated with pure water. As shown by a line designated by reference numeral 90, when current density of the exemplary fuel cell increased above about 1,050 milliamps per square centimeter ("mASC"), performance of the fuel cell continued to descend at a rate shown by the line 90.

The exemplary fuel cell was then run with a dilute surfactant water solution consisting of 12.5 weight percent ("wt %") methanol passing through a porous water transport plate of the cell. Next, the cell was operated for approximately three hours to vaporize and oxidize the methanol prior to returning operation with pure water. Then the fuel cell was returned to running with pure water as a cooling fluid passing through porous water transport plate. As shown by a line designated by reference numeral 92 in FIG. 4, when the current density of the exemplary fuel cell increased above about 1,050 mASC, the fuel cell performance did not decline at the same rate as it had prior to having the dilute surfactant water solution passed through the fuel cell shown by line 90.

Figure 5:
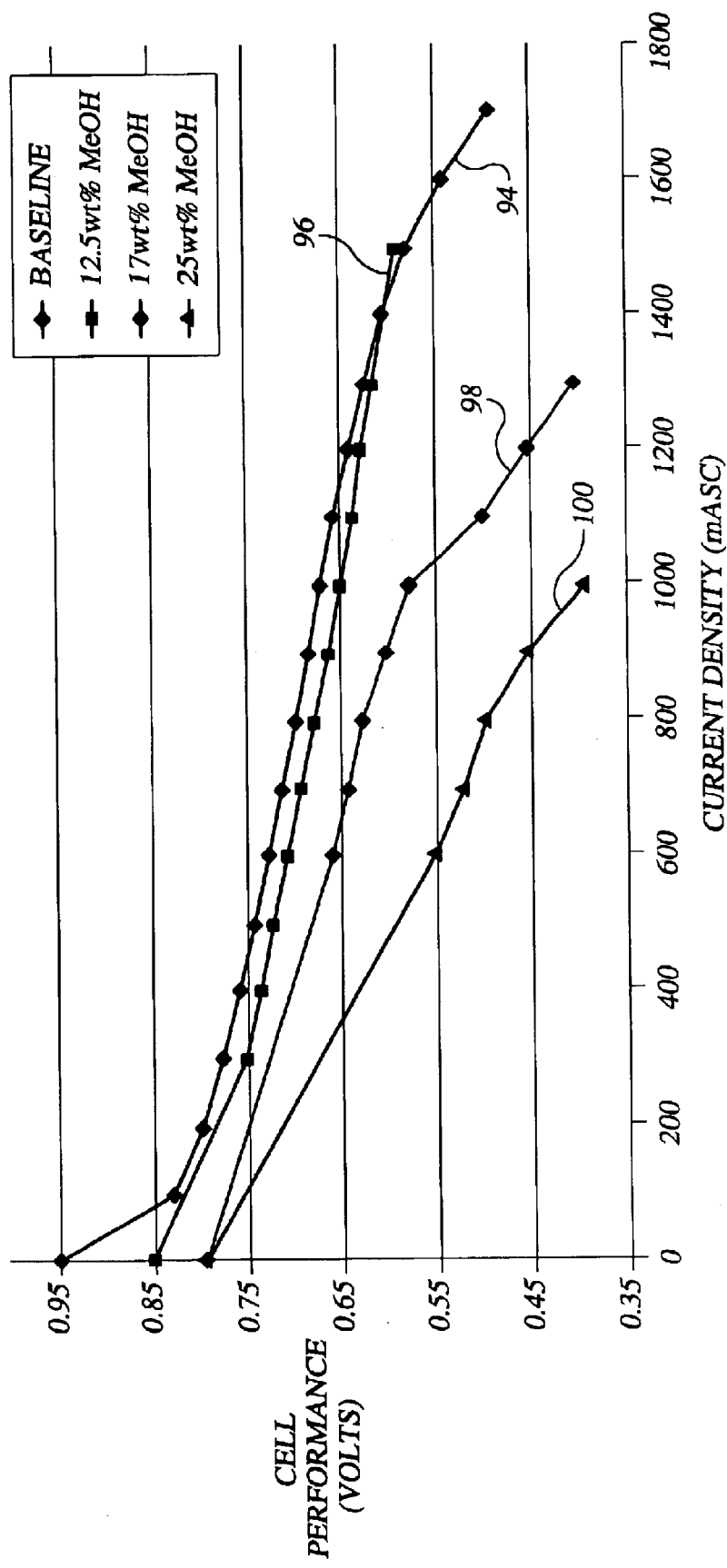
FIG. 5 is a graph showing comparative operation of fuel cells having no dilute surfactant solutions and having varying concentration of surfactant solutions.

Further tests utilizing the described exemplary fuel cell (not shown) were undertaken by the inventors to identify optimal concentrations of a dilute surfactant water solution. As shown in FIG. 5, the exemplary fuel cell was operated at increasing current densities with a baseline shown at reference numeral 94 for no dilute surfactant solution (i.e., pure water); a plot line at reference numeral 96 showing performance with a 12.5 wt % methanol water dilute surfactant water solution; a plot line at reference numeral 98 showing performance with a 17 wt % methanol water dilute surfactant water solution; and, a plot line at reference numeral 100 showing performance with a 25 wt % methanol water dilute surfactant water solution. As is apparent from the lines 94, 96, 98, 100 in FIG. 5, only a very limited range of surfactant water solutions results in enhancing performance of the exemplary fuel cell relative to its baseline 94. Therefore, for purposes herein the phrase "dilute surfactant water solution" will be defined to include a weight percent range of the surfactant compound in water that results in a surface tension of the solution that is not less than 50 dynes/cm.

It has been found that the method of using a temporary dilute surfactant water solution to enhance mass transport in a fuel cell of the present invention may be efficiently utilized by directing a temporary dilute surfactant water solution to pass through the cathode flow field prior to a break-in period of the fuel cell. For purposes herein, the "break-in period" is defined to mean a first time a fuel cell is operated and achieves 100% of a rated power of the fuel cell. "Rated power" is defined to mean that both current and voltage generated by the fuel cell meet design specifications. For example, it is known that performance of a fuel cell typically increases during an initial period of operation, referred to as a break-in period. While operating during the break-in period, a fuel cell must demonstrate a capacity to generate a designed rated power. For some fuel cells, a break-in period is also part of an acceptance test. To utilize the method of using a dilute surfactant solution to enhance mass transport within the fuel cell, a temporary dilute surfactant water solution is directed to flow with the cooling fluid flowing through the coolant loop 40 for a predetermined time. Then, flow of the dilute surfactant water solution through the coolant loop 40 is terminated, and the dilute surfactant water solution is removed from the fuel cell 10. The surfactant may be removed from the water solution within the fuel cell 10 by evaporation into the oxidant reactant stream passing through the cathode exhaust 26 from the cathode flow field 12 and by evaporation into the reducing fluid reactant stream passing through the anode exhaust 18 from the anode flow field 12. The surfactant may also be removed by chemical or electrochemical oxidation at the cathode catalyst 60 and anode catalyst 58 (shown in FIG. 2) as the fuel cell 52 is operated. Alternatively, the dilute surfactant water solution may be removed by terminating operation of the fuel cell 10 and then flushing the fuel cell flow fields 12, 20 and any coolant loop 40 or thermal management system (not shown) with a liquid capable of removing the dilute surfactant water solution. Additionally, the temporary dilute surfactant solution may be removed by purging flow fields of the fuel cell with an inert gas. The fuel cell would then commence operation in a normal manner of having the reducing fluid and oxidant reactant streams directed to flow through anode flow field 12 and cathode flow field 20 as shown in FIG. 1.

The present method of using a dilute surfactant solution to enhance mass transport in a fuel cell has been found to be especially valuable for fuel cells having hydrophobic support layers, such as a hydrophobic cathode diffusion layer 74 shown in FIG. 2. It has been found that a less hydrophobic structure generally results in improved initial performance, but decreased long-term performance stability. A more hydrophobic structure results in increased long-term performance stability at the expense of reduced initial performance. Utilizing the described method of using a dilute surfactant solution for a break-in period in a fuel cell having a hydrophobic structure results in increased initial performance, while retaining a long-term stability advantage of a more hydrophobic support structure.

The present invention includes a fuel cell apparatus such as the fuel cell 52 of FIG. 2, wherein the fuel cell 52 includes the dilute surfactant water solution as a temporary dilute surfactant water solution within the cooling fluid within the coolant loop 40 (shown in FIG. 1). The fuel cell 52 also includes a porous water transport plate, such as the porous cathode water transport plate 78 in fluid communication with a cathode flow field 85 defined adjacent to the cathode catalyst 60, so that upon operation of the fuel cell 52, the temporary dilute surfactant water solution passes into the cathode flow field 85 where the surfactant is removed from the fuel cell 52 through evaporation within the oxidant reactant stream passing through the cathode flow field 85, and/or through oxidation at the cathode catalyst 60 or anode catalyst 60 so that the temporary dilute surfactant water solution is completely removed from the fuel cell 52 after a predetermined period within the fuel cell 52. By the phrase "completely removed from the fuel cell", it is meant that none of the temporary dilute surfactant water solution remains within the fuel cell 52 or any coolant loop 40 or thermal management system (not shown) in fluid communication with the fuel cell 52.

While the present invention has been disclosed with respect to the described and illustrated methods and embodiments, it is to be understood that the invention is not to be limited to those embodiments. For example, while the second fuel cell 52 is described as including a proton exchange membrane electrolyte 56, the fuel cell 52 may include other electrolytes known in the art. Accordingly, reference should be made primarily to the following claims rather than the foregoing description to determine the scope of the invention.

What is claimed is:

1. A method of using a temporary dilute surfactant water solution to enhance mass transport in a fuel cell (52) for generating electrical current from hydrogen containing reducing fluid fuel and oxygen containing oxidant reactant streams, the fuel cell (52) having a cathode catalyst (60) and an anode catalyst (58) on opposed surfaces of an electrolyte (56), having a cathode flow field (85) for directing the oxygen containing oxidant reactant stream to pass adjacent to the cathode catalyst (60), and having an anode flow field (71) for directing the hydrogen containing reducing fluid reactant stream to flow adjacent to the anode catalyst (58), the method comprising the steps of:

a. directing the temporary dilute surfactant water solution to flow through at least one of the flow fields (71) (85), wherein the dilute surfactant water solution has a surface tension of not less than 50 dynes/cm;

b. then, removing the dilute surfactant solution from the fuel cell (52); and, c. then, directing the oxygen containing oxidant reactant stream to flow through the cathode flow field (85) and directing the hydrogen containing reducing fluid reactant stream to flow through the anode flow field (71).

2. The method of claim 1, wherein the directing the temporary dilute surfactant water solution to flow through the at least one of the flow fields (71) (85) step is performed prior to a break-in period, the break-in period being until the fuel cell (52) has achieved 100% of its rated power.

3. The method of claim 1, wherein the temporary dilute surfactant water solution is directed to flow through the cathode flow field (85).

4. The method of claim 1, wherein the temporary dilute surfactant water solution is directed to flow through both the cathode flow field (85) and the anode flow field (71).

5. The method of claim 1, wherein the surfactant added to water to make the temporary dilute surfactant water solution is a surfactant selected from the group consisting of linear alcohols, branched alcohols, aldehydes, ketones, and organic acids, and mixtures thereof.

6. The method of claim 1, wherein the surfactant added to water to make the temporary dilute surfactant water solution is a surfactant selected from the group consisting of methanol, ethanol, propanol, isopropyl alcohol, acetone, acetic acid, acetaldehyde, and propylamine, and mixtures thereof.

7. The method of claim 1, wherein the surfactant added to water to make the temporary dilute surfactant water solution is a surfactant selected from the group consisting of surfactants having a solubility in water that is greater than 25 grams per 100 grams of water, having a surface tension not greater than 35 dynes/cm, and having a boiling point of not greater than 120° C.

8. A method of using a temporary dilute surfactant water solution to enhance mass transport in a fuel cell (52) for generating electrical current from hydrogen containing reducing fluid fuel and oxygen containing oxidant reactant streams, the fuel cell (52) having a cathode catalyst (60) and an anode catalyst (58) on opposed surfaces of an electrolyte (56), having a cathode flow field (85) for directing the oxygen containing oxidant reactant stream to pass adjacent to the cathode catalyst (60), having an anode flow field (71) for directing the hydrogen containing reducing fluid reactant stream to flow adjacent to the anode catalyst (58), and having a porous water transport plate (78) secured in fluid communication with the cathode flow field (85) for directing a liquid cooling fluid to pass through the plate (78), the method comprising the steps of:

a. directing the temporary dilute surfactant water solution to flow in the liquid cooling fluid through the porous water transport plate (78) so that the dilute surfactant water solution flows through the cathode flow field (85), wherein the dilute surfactant water solution has a surface tension of not less than 50 dynes/cm;

b. then, removing the dilute surfactant water solution from the fuel cell (52); and, c. then, directing the oxygen containing oxidant reactant stream to flow through the cathode flow field (85) and directing the hydrogen containing reducing fluid reactant stream to flow through the anode flow field (71).

9. The method of claim 8, wherein the surfactant added to water to make the temporary dilute surfactant water solution is a surfactant selected from the group consisting of linear alcohols, branched alcohols, aldehydes, ketones, and organic acids, and mixtures thereof.

10. The method of claim 8, wherein the surfactant added to water to make the temporary dilute surfactant water solution is a surfactant selected from the group consisting of methanol, ethanol, propanol, isopropyl alcohol, acetone, acetic acid, acetaldehyde, and propylamine, and mixtures thereof.

11. The method of claim 8, wherein the surfactant added to water to make the temporary dilute surfactant water solution is a surfactant selected from the group consisting of surfactants having a solubility in water that is greater than 25 grams per 100 grams of water, having a surface tension not greater than 35 dynes/cm, and having a boiling point of not greater than 120° C.

12. The method of claim 8, wherein the method includes the additional step of securing a hydrophobic cathode diffusion layer (74) adjacent to the cathode catalyst (60) for supporting the cathode catalyst (60) and for permitting flow of the dilute surfactant water solution through the hydrophobic cathode diffusion layer (74).

13. The method of claim 8, wherein the directing the temporary dilute surfactant water solution to flow through the at least one of the flow fields (71) (85) step is performed prior to a break-in period, the break-in period being until the fuel cell (52) has achieved 100% of its rated power.

* * * * *